(12) United States Patent
Lee et al.

(10) Patent No.: US 8,217,371 B2
(45) Date of Patent: Jul. 10, 2012

(54) LUMINESCENT SYSTEM

(75) Inventors: Shuit Tong Lee, Yuen Long (HK);
Dorothy Duoduo Ma, Changsha (CN)

(73) Assignee: City University of Hong Kong,
Kowloon (HK)

( * ) Notice: Subject to any disclaimer, the term of this patent is extended or adjusted under 35 U.S.C. 154(b) by 637 days.

(21) Appl. No.: 12/192,010

(22) Filed: Aug. 14, 2008

(65) Prior Publication Data

US 2010/0314558 A1     Dec. 16, 2010

(51) Int. Cl.
*F21K 2/00*     (2006.01)
(52) U.S. Cl. .................................................. 250/462.1
(58) Field of Classification Search ............. 250/462.1, 250/458.1, 459.1; 428/403
See application file for complete search history.

(56) References Cited

U.S. PATENT DOCUMENTS

| | | | | |
|---|---|---|---|---|
| 5,500,054 A | * | 3/1996 | Goldstein | 136/253 |
| 7,228,017 B2 | * | 6/2007 | Xia et al. | 385/12 |
| 7,247,443 B2 | * | 7/2007 | Su | 435/7.1 |
| 7,285,329 B2 | * | 10/2007 | Kaneko et al. | 428/403 |
| 2002/0119485 A1 | * | 8/2002 | Morgan | 435/6 |
| 2007/0063154 A1 | * | 3/2007 | Chen et al. | 250/483.1 |

FOREIGN PATENT DOCUMENTS

CN        101497792 A   *   8/2009

* cited by examiner

*Primary Examiner* — David Porta
*Assistant Examiner* — Faye Boosalis
(74) *Attorney, Agent, or Firm* — Heslin Rothenberg Farley & Mesiti PC

(57) ABSTRACT

A luminescent system includes a layer of donor material, an acceptor material and a barrier layer therebetween. The energy transfer between the donor and acceptor is biased to the acceptor layer, by an asymmetric energy transfer efficiency created by the barrier layer. Energy from the donor material is converted into photo-luminescence in the acceptor layer by discouraging photo-luminescence quenching caused by energy backflow.

20 Claims, 11 Drawing Sheets

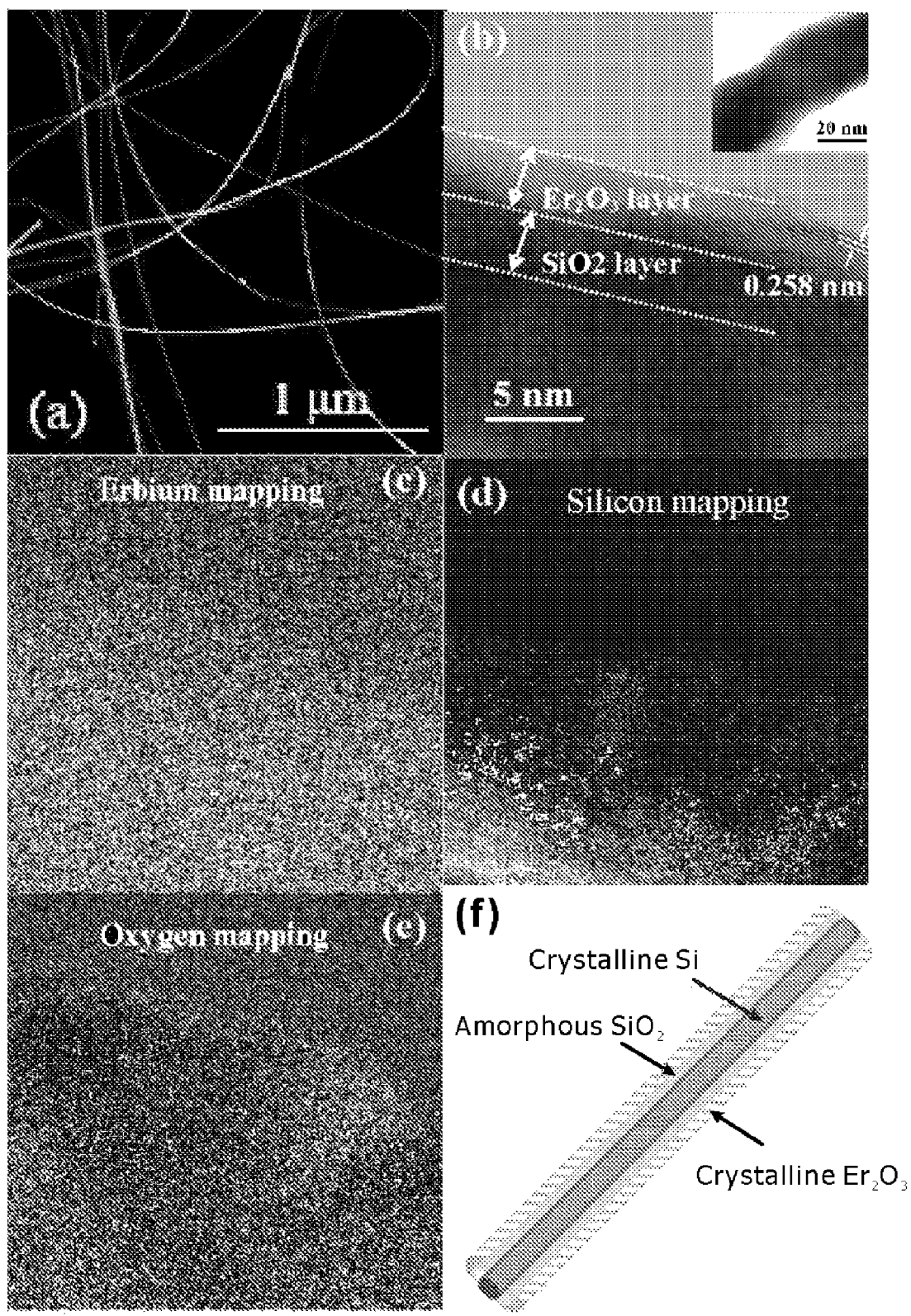
Figure 4 (a) to (f)

LUMINESCENT SYSTEM

TECHNICAL FIELD

The present invention generally relates to luminescent light sources.

More particularly, the present invention relates to luminescent cables, films, as well as nanostructures such as luminescent nano-wires, nano-ribbons, nano-particles and so on.

BACKGROUND INFORMATION

Presently, erbium-doped silicon or silicon-related materials are used for their luminescence at the wavelength of about 1.5 μm. This luminescence is due to $^4I_{13/2}$-to-$^4I_{15/2}$ intra-4-f-electron shell transition of erbium ion $Er^{3+}$ that can be excited both optically and electrically.

Accordingly, erbium-doped silicon is one of the most effective materials with which silicon-based light sources may be made. Such materials may be used as films, in optic fibres or nanowires. In particular, nanowires are useful in electronic and optical devices including integrated circuit, transistors, photodetectors, biochemical sensors etc. (Generally, a nanostructure has one or two aspects of its dimensions being in the order of hundreds of nanometers. Therefore, the radius of the luminescent nano-cable, nanowire and nano-particle is typically equal to or less than 500 nms, and the thickness of nano-ribbon and layered nano-film is equal to or less than 500 nm.)

However, the efficiency of erbium-doped silicon photonics is hampered by inherent problems causing the luminescence of erbium-doped silicon to be easily quenched at between 77 K to room temperature, e.g. about 300 K. The quenching mechanisms are mainly Auger and phonon-assisted de-excitations (via Dexter mechanisms).

Auger de-excitation is the process in which one electron of the excited species gets into a higher electronic state using energy from another electron from the same species, thereby releasing the excitation energy without giving off a photon, so-called a non-radiative de-excitation. Phonon-assisted de-excitation is also a non-radiative de-excitation process, in which the energy of the excited species is released via phonons, without giving off a photon. At a concentration in excess of $10^{22}$ cm$^{-3}$ in silicon or silica, erbium atoms tend to aggregate in clusters. This close proximity results in dipolar-dipolar interaction between the erbium ions, leading to a process in which an excited erbium ion de-excites non-radiatively by transferring energy to a neighboring excited erbium ion, promoting the neighboring erbium ion to an even higher excited state. This process is generally known as up-conversion, also a non-radiative de-excitation.

Quenching of erbium luminescence in erbium-doped silicon is primarily associated with energy backflow from excited erbium ions to free carriers in silicon via the three processes described above. The free carriers are, in turn, made more active by a higher temperature. As a result, erbium ion luminescence in an erbium-doped silicon is extremely weak at room temperature.

These mechanisms limit erbium excitation and are primarily responsible for thermal quenching of 1.5 μm luminescence of $Er^{3+}$ ions embedded in crystalline silicon.

Furthermore, it is not easy to dope silicon or silicon-related material with erbium due to solubility limitation. This may only be achieved to an insufficiently low erbium concentration.

Therefore, it is desirable to propose a luminescent silicon structure in which these problems are reduced, eliminated or minimized.

SUMMARY OF THE INVENTION

In a first aspect, the invention comprises a luminescent system comprising a barrier between a donor material and an optically-active compound, wherein the barrier allows energy from the donor material to transfer to the layer of optically-active compound to excite the optically active compound into photo-luminescent emission, and the barrier restricts energy transfer from the optically-active compound to the donor material, such that quenching of the photo-luminescent emissions from the optically-active compound is reduced.

Preferably, the barrier layer is made of silica or a dielectric or insulating layer, in which the carriers are few, bound and not free, and unlike erbium in silicon, the erbium ions are less subjected to room- or high-temperature related de-excitation due to presence of the barrier layer.

In a second aspect, the invention comprises a method of preparing a luminescent system comprising the steps of heating silicon oxide (SiO) powder to provide silicon vapors, precipitating the silicon vapors to form silicon structures having a surface layer of silica, heating erbium metal to provide erbium vapors and precipitating the erbium vapors to form an erbium oxide layer on the silica surface of the silicon structures, the layer of silica being a barrier between the silicon structure and the erbium oxide layer, the barrier allowing energy from the silicon structure to transfer to the erbium oxide layer to excite the erbium oxide into photo-luminescent emission, and the barrier restricting energy transfer from the erbium oxide layer to the silicon structure.

BRIEF DESCRIPTION OF THE DRAWINGS

Aspects of the invention will now be described in a non-limitative manner with references to the following figures, in which like numerals refer to like parts, in which

FIG. 1b is a model of asymmetric energy transfer in the example of FIG. 1a;

FIG. 3a is a Scanning Electron Microscope (SEM) image of the example of FIG. 1a;

FIG. 3b is a High-Resolution Transmission Electron Microscopic (HRTEM) image of the example of FIG. 1a;

FIG. 4a is another SEM image of the example of FIG. 1a;

FIG. 4b is a HRTEM image of an edge of the example of FIG. 1a;

FIG. 4c shows erbium mapping in the sample of FIG. 4b;

FIG. 4d shows silicon mapping in the sample of FIG. 4b;

FIG. 4e shows oxygen mapping in the sample of FIG. 4b;

FIG. 4f is another illustration of the example of FIG. 1a;

FIG. 6 shows photo-luminescence intensity as a function of excitation power at 11.3°K and 291°K, of the example of FIG. 1a;

FIG. 7(a) shows the photo-luminescence spectrum of the first example of FIG. 1a;

FIG. 8(a) shows another TEM image of the example of FIG. 1a; and

DETAILED DESCRIPTION OF THE INVENTION

Figure 1A:
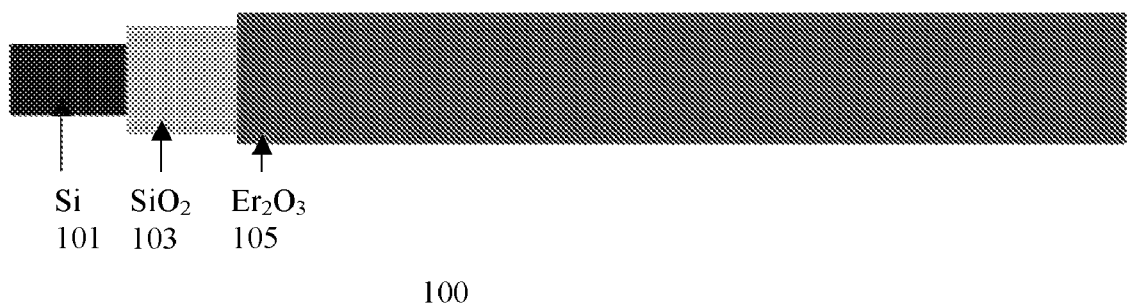
FIG. 1a illustrates a first example of the invention in the form of a silicon nanowire.

FIG. 1 illustrates an embodiment which is a silicon nanowire comprising a silicon (Si) donor or host layer 101, a silica ($SiO_2$) barrier layer 103 surrounding the silicon donor layer 101, and an acceptor layer 105 of crystalline erbium oxide ($Er_2O_3$) surrounding the silica barrier layer 103.

The donor layer 101 is capable of absorbing light and transferring energy to an acceptor to cause the acceptor to emit photo-luminescence.

The acceptor layer 105 contains an optically active compound (an acceptor), which is strongly fluorescent and can be activated via energy from the donor layer 101 to photo-luminescence. The acceptor layer 105 is sometimes referred to as the 'dopant' layer since it is typical for the layer to be 'doped' with the optically active compound. However, in this embodiment, the acceptor layer is made of crystalline erbium oxide ($Er_2O_3$).

The materials, and therefore the energy levels, of the donor layer 101 and the acceptor layer 105 are chosen such that excitation energy tends to be forward-transferred from the donor layer 101 to the acceptor layer 105 by the Förster mechanism. Förster mechanism is a system-dependent energy transfer mechanism which has an energy transfer range of about 10 nm between $Si/SiO_2$.

Thus, when energy is transferred from the silicon to the erbium oxide 105, the resulting $Er^{3+}$ ion excitation produces luminescence.

Furthermore, the donor layer 101 and the acceptor layer 105 are separated by a barrier layer 103 which is sufficiently thick to prevent energy backward transferred from the acceptor layer 105 to the donor layer 101 by the Dexter mechanism. In comparison to the Förster mechanism, the Dexter mechanism is a short-range mechanism having an energy transfer range of only 2 nm between silicon and silica.

In this embodiment, the silica barrier layer 103 has a thickness of 2-5 nm, which is thin enough to allow efficient Förster energy transfer from the silicon donor layer 101 to the erbium oxide acceptor layer 105, but thick enough to prevent or suppress energy backflow or de-excitation from the erbium oxide acceptor layer 105 to the silicon donor layer 101 by Dexter mechanism. Thus, the silica barrier layer 103 between the silicon donor layer 101 and the erbium oxide acceptor layer 105 improves the photo-luminescence efficiency of the erbium oxide acceptor layer 105 by creating an asymmetry in energy transfer between the donor layer 101 and the acceptor layers 105 and biasing the energy transfer from the donor layer 101 to the acceptor layer 105. This ensures that more of the excitation energy transferred to the erbium oxide is efficiently transformed into photo-luminescent emissions than quenched.

Figure 1B:
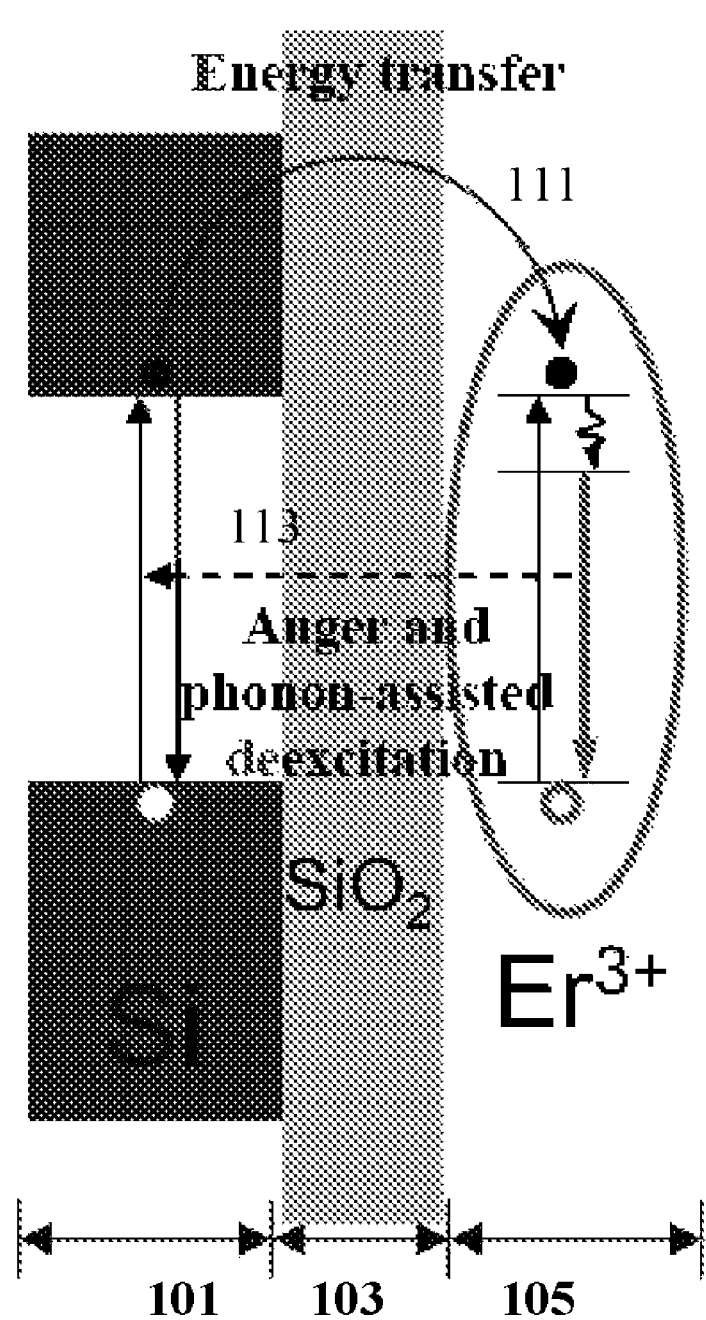

FIG. 1b illustrates this principle. The energy in the silicon donor layer 101 is transferred to the erbium ions in the erbium oxide layer 105 despite the barrier layer of silica 103 by Foster mechanism, as indicated by the curved arrow 111. Typically, some of the energy in the consequently excited erbium ions may be quenched by flow of the energy back to the silicon donor layer 101, as indicated by arrow 113. However, the mechanism by which energy is transferred from the erbium ions to the silicon donor layer 101 is the Dexter mechanism, which is blocked by the silica barrier layer (hence the arrow 113 indicating this is dotted). Therefore, the silica barrier layer 103 favors energy transfer from the silicon donor layer 101 to the erbium oxide acceptor layer 105, and restricts back-transfer of excitation energy from the erbium oxide acceptor layer 105 to the silicon donor layer 101.

The photo-luminescence of the embodiment is further enhanced by the fact that Auger energy from excited erbium ions does not backflow as efficiently to bound carriers in the silica barrier layer 103 or in silicon layer 101. Thus, the silica barrier layer 103 proximate the erbium ions is able to suppress short-range direct interaction of the excited erbium ions with the free carriers and thermal phonons in the underlying silicon donor layer 101. In the absence of such a barrier layer 103, strong thermal quenching or backward energy transfer readily occurs due to thermally-excited phonon- and Auger-assisted energy transfer, causing drastic photo-luminescence decrease at elevated temperatures.

It is preferable that the concentration of the acceptor atoms is high enough for maximum photo-luminescence but not too dense for aggregation to cause up-conversion losses. Crystalline erbium oxide 105 provides a favorably higher concentration of erbium ions than that obtainable by doping silicon with erbium. Furthermore, by using crystalline erbium oxide, the requirement and difficulty of having to dope silicon with erbium is removed. Experiments show that erbium oxide-clad silicon maintains strong erbium emission at 1.54 μm (~0.8 eV) at room-temperature, indicating that there are high concentrations of erbium activated for luminescence. However, the oxygen coordination number of the body-centre-cubic (bcc) and fcc phases of crystalline erbium oxide are 8 and 12, respectively. For this reason, the oxygen is capable of screening neighboring erbium atoms from energy backflow, i.e. absorption of energy by neighboring ions leading to quenching of luminescence. This helps to reduce the probability of up-conversion. Furthermore, the 4f electrons of erbium are shielded by the outer $5s^25p^6$ electrons from the full effects of the donor crystal field, thus the intra-4-f shell optical transitions are nearly independent of the donor materials. This means that the photo-luminescence or optical property of erbium is localized and independent of its surrounding, and thus stays almost constant in any chemical environment or compound.

Furthermore, it is preferable that there is a one-to-one or optimal acceptor-to-donor ratio at close enough proximity to ensure optimal donor-to-acceptor Förster energy transfer. Thus, the layer of crystalline erbium oxide near the silicon core provides an Er:Si ratio of about 1:1 at sufficiently close proximity. This leads to efficient excitation energy transfer from the silicon to the erbium oxide. Thus, photo-luminescence of crystalline erbium oxide is superior to the photo-luminescence of erbium-doped silicon.

Accordingly, an embodiment has been described which provides a luminescent system comprising a barrier (the silica layer 103) between a donor material (in the donor layer 101) and an optically-active compound (in the acceptor layer 103), wherein the barrier allows energy from the donor material to transfer to the layer of optically-active compound to excite the optically active compound into photo-luminescent emission, but the barrier restricts energy transfer from the optically-active compound to the donor material. In this way, such that quenching of the photo-luminescent emissions from the optically-active dopant is reduced.

Figure 2A:
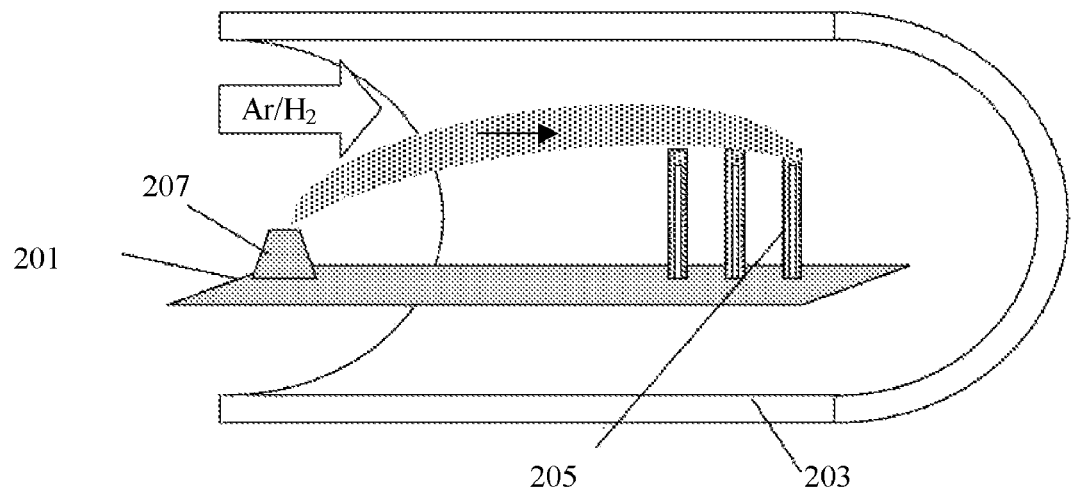
FIGS. 2a and 2b illustrate one example of how silicon nanowires of the example of FIG. 1a are made.
Figure 2B:
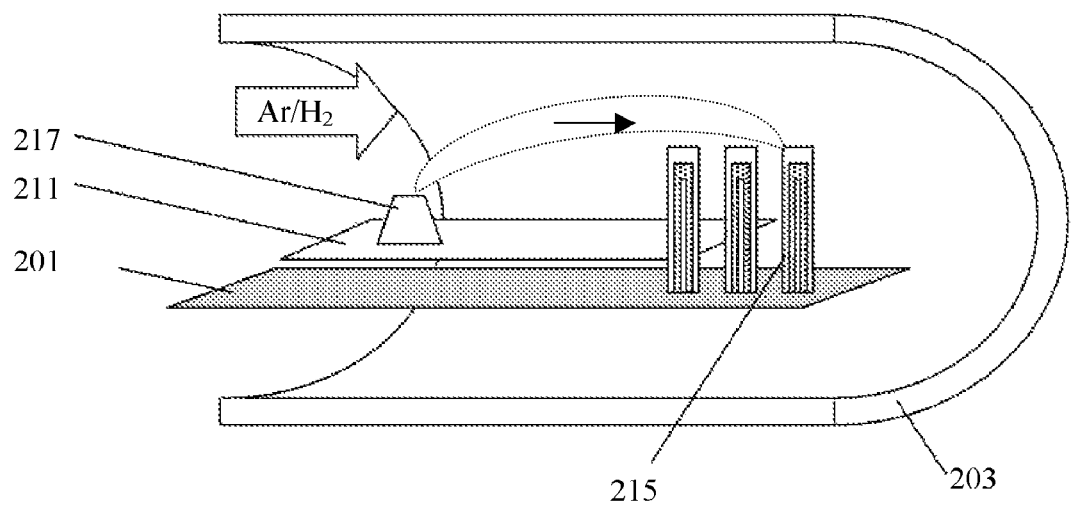

The following is an example of the steps by which the above embodiment may be made using the oxide-assisted growth (OAG) method, as shown in FIGS. 2a and 2b.

1. Silicon oxide (SiO) powder 207 is placed on an alumina plate 201 (3 cm in length and 2 cm in width) and positioned at the centre of a horizontal alumina tube 203 mounted inside a high-temperature tube furnace (not shown).
2. The tube atmosphere is then evacuated and a carrier gas consisting of 95% Ar and 5% $H_2$ is introduced and maintained at a pressure of 500 Torr and a constant flow rate of 50 sccm.
3. The temperature at the alumina boat is kept at 1300° C. for 5 hours. Consequently, silicon nanowires 205 are formed at the tube wall or on the aluminum plate 201 downstream of the Ar/$H_2$ flow, where the temperature is lower at about 930° C., i.e. a temperature gradient exists across the alumina tube.

The silicon nanowires 205 obtained this way typically consist of a crystalline silicon core cladded by a silica layer, with atomically smooth sidewalls. These nanowires 205 have a diameter within the range of tens of nanometers and a length of up to millimeters.

Figure 3A:
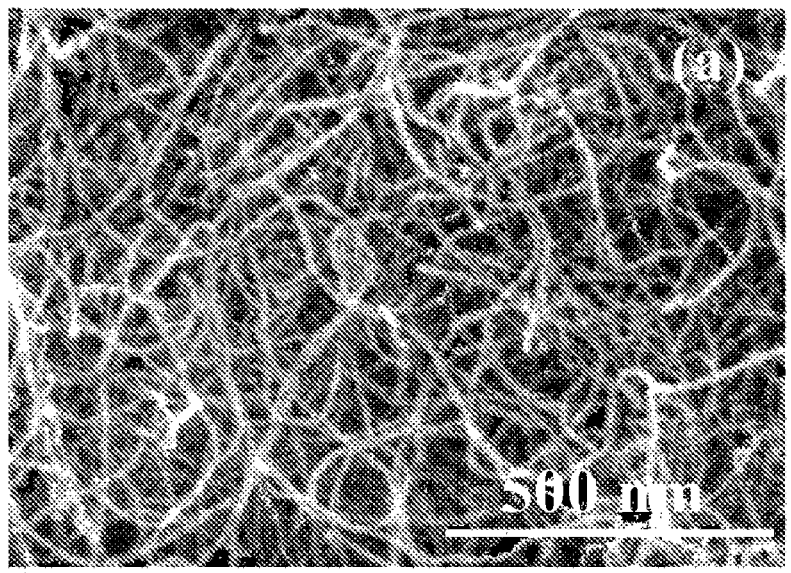
Figure 3B:
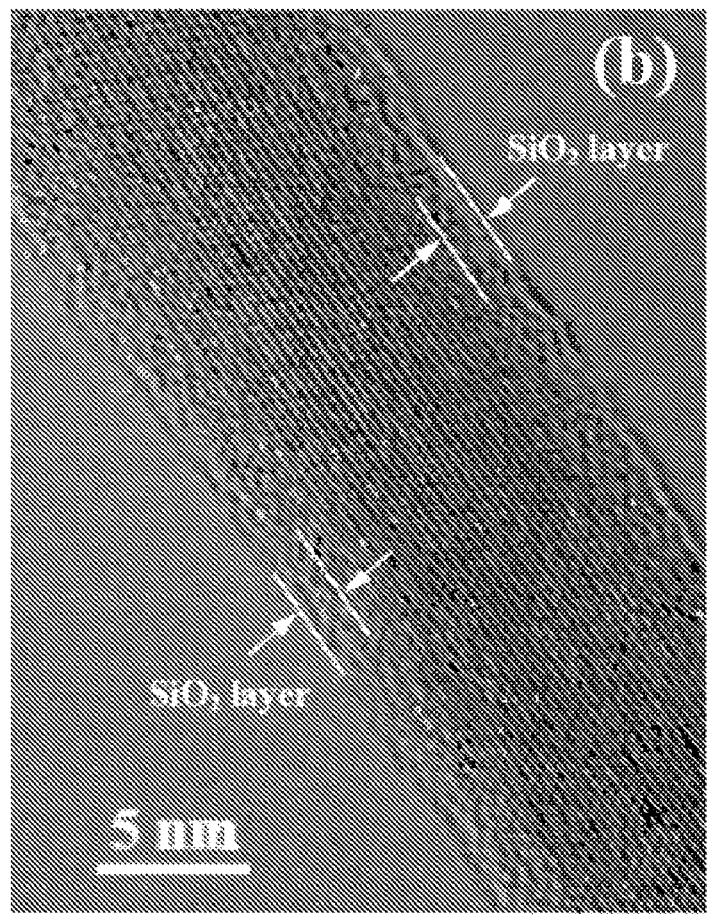

FIGS. 3(*a*) and (*b*) show the silicon nanowires having an average diameter of about 20 nm, including a silica thickness of about 2 nm.

1. FIG. 2*b* shows that, subsequently, erbium metal 217 is placed on an alumina plate 211 of 2 cm in length and 1 cm wide, into the same furnace and positioned at the centre of the alumina tube 203.
2. The atmosphere in the system is then evacuated again and the pressure is reduced to pressure of $10^{-4}$ Torr. Argon flow is then provided through the alumina tube at 50 sccm (standard cubic centimeters per minute),
3. The erbium 217 source is then heated to 1150° C. and kept at this temperature for 2 hours.
4. The argon flow carries generated erbium vapors to be deposited and accumulated on the silicon nanowires 205 at the tube wall or on the alumina plate 201.
5. The nanowires 205 are then annealed in the erbium vapors at 1100° C. for 5 minutes to form a layer of erbium oxide on the nanowires 215.
6. The erbium coated nanowires 215 are then collected after cooling to room temperature.

The erbium oxide-coated silicon nanowires 215 obtained have an average diameter of about 40 nm, as shown in FIGS. 4*a* to 4*f*.

FIG. 4*a* shows the SEM image of $Er_2O_3$-coated OAG-grown Si nano-wires.

FIG. 4*b* is a High-Resolution Transmission Electron Microscopic (HRTEM) image of the edge of a nanowire obtained using the method, showing a continuous crystalline erbium oxide acceptor layer. The lattice spacing is about 0.258 nm, which is in good agreement with the spacing of the 200 plane (0.258 nm) of face-centre-cubic (fcc) $Er_2O_3$. The agreement in the spacing shows the $Er_2O_3$ is in the crystalline form of face-centre-cubic (fcc) structure. The figure inset in FIG. 4*b* is the corresponding low-magnification TEM image of a silicon nanowire, showing a diameter of about 30 nm and a light contrast shell of about 4 nm.

FIGS. 4*c*, 4*d*, and 4*e* show respectively the element mapping of erbium, silicon, and oxygen in the nanowire, each corresponding to the respective parts in the HRTEM image of FIG. 4*b*. The element mapping indicates that almost no silicon is present in the erbium oxide layer, while erbium and oxygen are uniformly distributed over the entire length of the wire. Erbium is not detected inside the silicon nanowires despite the erbium-coating process, which is due to the slow diffusion rate of erbium in silicon and silica.

FIG. 4*f* illustrates the structure of silicon nanowires after erbium coating and modelled into a coaxial cable consisting of a crystalline silicon core and a crystalline erbium oxide shell or cladding, separated by a thin silica interlayer of a few nanometers.

Experiments to measure the photo-luminescence of the erbium oxide-clad silicon nanowires were performed using an argon laser, at the wavelength of 514.5 nm, for excitation with a spot size of 1 $mm^2$ on a sample.

Figure 5:
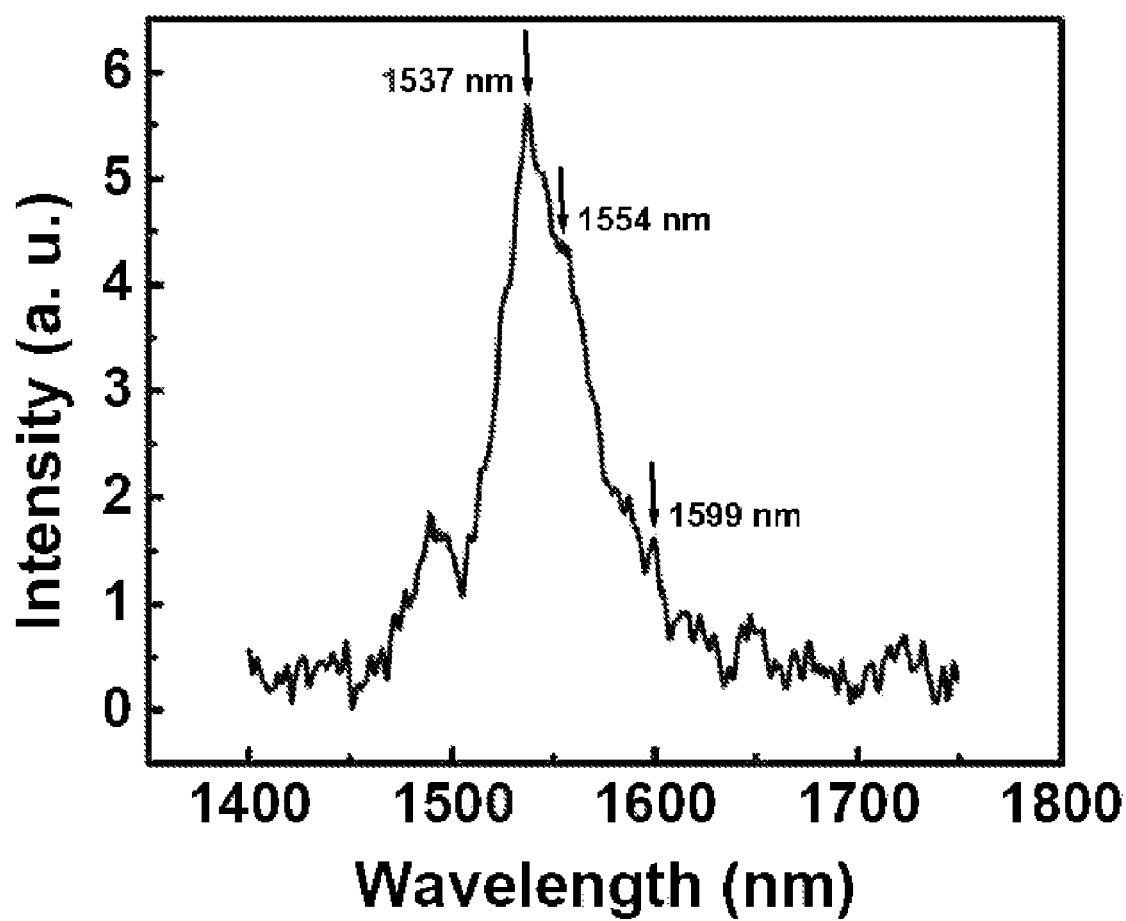
FIG. 5 shows the photo-luminescence spectrum of the example of FIG. 1a at room temperature and at 1000 mW excitation power.

The photo-luminescence spectra were recorded at both room temperature (291°K) and at a low temperature (11.3°K) and are shown in FIG. 5. A distinct broad emission band can be clearly observed in the spectral region of 1458-1500 nm, which can be primarily attributed to the formation of Er—O complexes. The photo-luminescence spectrum is dominated by the intense peak at 1537 nm with weak peaks at 1554 and 1599 nm; they are associated with the radiative $^4I_{13/2}$-to-$^\infty I_{15/2}$ transition arising from Er-related centres of cubic symmetry.

Figure 6:
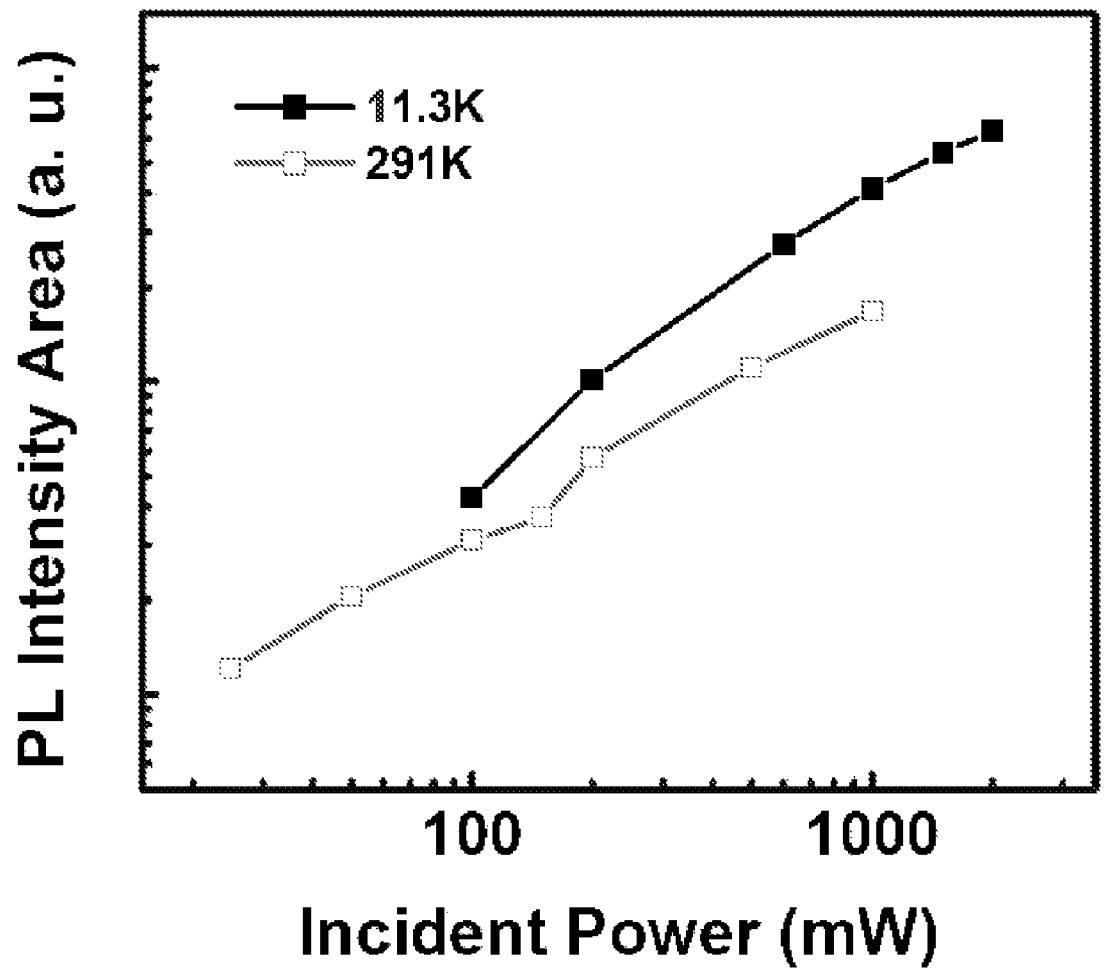

The power dependence of photo-luminescence intensity of the erbium oxide-clad silicon nanowires is illustrated in FIG. 6, showing that the photo-luminescence intensity increases almost linearly with increasing excitation power, and does not saturate even up to an excitation power of 2000 mW at both room-temperature (291°K) and low-temperature (11.3°K).

TABLE 1

| Incident Power (mW) | 100 | 200 | 1000 |
|---|---|---|---|
| PL Intensity Ratio ($I_{RT}/I_{LT}$) | 0.73 | 0.57 | 0.47 |

Table 1 shows the ratio $I_{291\,K}/I_{11.3\,K}$ of the integrated photo-luminescent intensity at 291°K and 11.3°K, versus excitation power intensity. The values of $I_{291\,K}/I_{11.3\,K}$ are in the range of 0.41-0.73, showing only a slight decrease despite significant increase in excitation power. This indicates strong suppression of Auger and phonon-assisted de-excitations of the luminescence of erbium oxide-clad silicon nanowires, as the intensity of luminescence could not be proportional to the excitation power if there is significant de-excitation of the luminescence at different temperatures.

Furthermore, the temperature dependency of the integrated photo-luminescence intensity of the embodiment is over 10 times smaller or the $I_{291\,K}/I_{11.3\,K}$ ratio is over 10 times larger than that (ratio<1%) reported previously for erbium-doped silicon materials. This result also indicates that temperature quenching of photo-luminescence is strongly suppressed. Consequently, the room-temperature photo-luminescence intensity of the embodiment remains nearly as strong as that of low-temperature photo-luminescence e.g. 11.3°K.

Advantageously, the described structure of donor layer 101, barrier layer 103 and acceptor layer 105 facilitates independent tuning of each layer to meet specific requirements for an optimum photo-luminescence system. For example, the materials used in the three-layered nanostructures can be tailored to emit in any desirable wavelength.

Furthermore, the acceptor layer 105 can be advantageously designed to contain the most suitable or most optically active "acceptor" in optimum concentration. For example, the concentration of erbium in crystalline erbium oxide in the first embodiment exceeds the concentration of erbium limited by erbium solubility in silicon.

The thickness of the barrier layer 103 may also be advantageously pre-determined accordingly by the material used for the donor and acceptor layers 101 and 105, respectively, to ensure asymmetric energy transfer and efficient donor-acceptor optical coupling.

Advantageously, embodiments may include luminescent nanostructures useable in photonics, optoelectronics and electronic devices, such as LEDs, laser diodes, waveguides or detectors. Furthermore, embodiments of other nanostructures are possible, for example, nano-ribbons (NRs), nano-particles (NPs), and also non-nano, normal size structures such as cables or films.

Instead of the described $Si/SiO_2/Er_2O_3$ configuration, embodiments using other materials are also possible, such as configurations of $ZnS/SiO_2/MnS$ (such as for nano-ribbons) and $Y_2O_3/SiO_2/Eu_2O_3$ (such as for nano-particles).

FIG. 7 shows the room-temperature photo-luminescence spectra of three nanostructure photo-luminescent systems, i.e. (a) $Si/SiO_2/Er_2O_3$ nano-wires, (b) $ZnS/SiO_2/MnS$ nano-ribbon; and (c) $Y_2O_3/SiO_2/Eu_2O_3$ nano-particles, yielding photo-luminescence in three distinctive wavelengths: 1.5 μm, 590 nm, and 611 nm respectively.

Figure 7A:
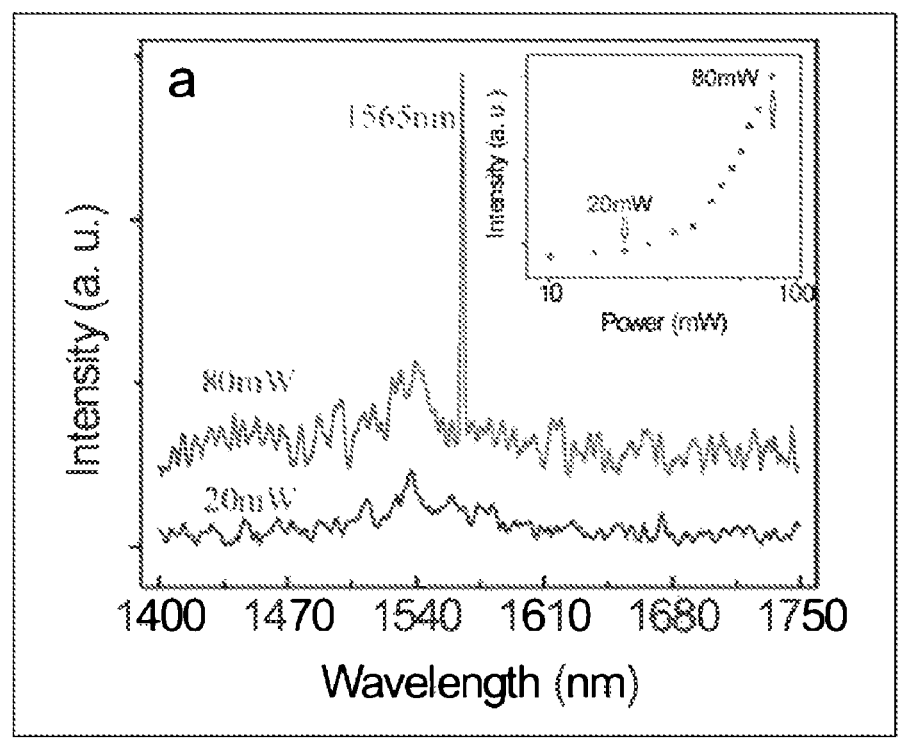

More specifically, FIG. 7(a) shows the photo-luminescence spectrum of $Si/SiO_2/Er_2O_3$ nanowires, demonstrating a lasing peak at 1565 nm and a super linear relationship between photo-luminescence output and input power (inset), having a lasing threshold at 20 to 30 mW.

Figure 7B:
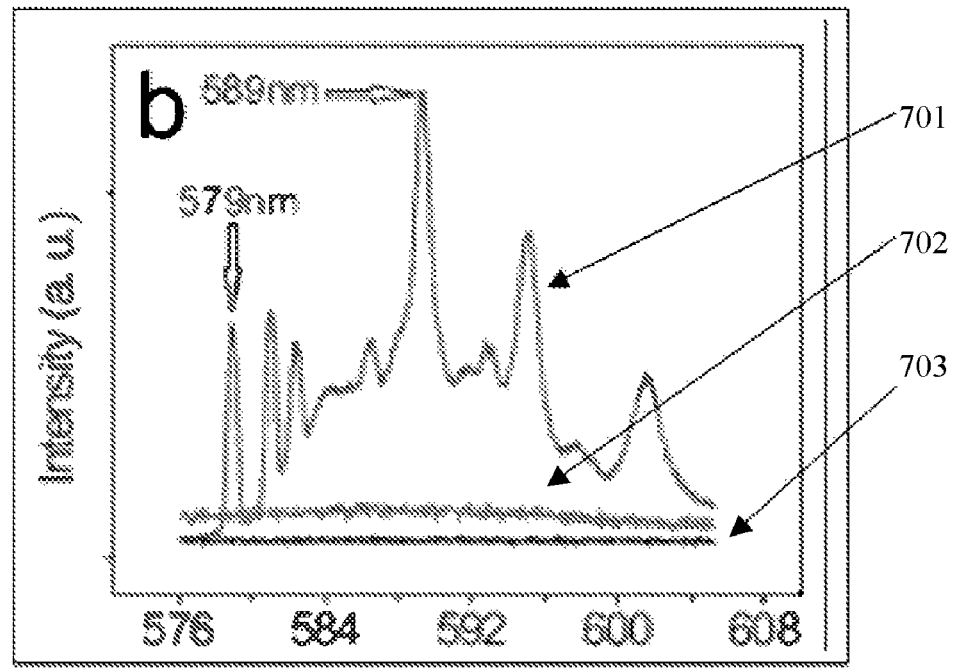
FIG. 7(b) shows the photo-luminescence spectrum of a second example of the invention.

FIG. 7(b) illustrates the photo-luminescence spectrum of a second embodiment, which is nano-ribbons comprising layers of $ZnS/SiO_2/MnS$ 701 (Zinc Sulphide, Silicon dioxide and Manganese Sulphide). As illustrated, the nano-ribbons exhibit photo-luminescence fine structures (lasing modes) of nano-ribbon cavity originating mainly from two transitions, one at 579 nm and the other at 589 nm. The sharp and narrow (<0.8 nm) lasing modes with a spacing of several nm occur along the ribbon axis. The photo-luminescence spectrum of nano-ribbons made of Mn-doped silicon 702 (second lowest line in the graph) and the photo-luminescence spectrum of nano-ribbons made of pure ZnS 703 (the bottom-most line) are superimposed for comparison. The graphs show that the photo-luminescence of both Mn-doped silicon nano-ribbons and pure ZnS nano-ribbons are weak and featureless when compared to that 701 of the ZnS/SiO2/MnS structure under the same measurement conditions.

Figure 7C:
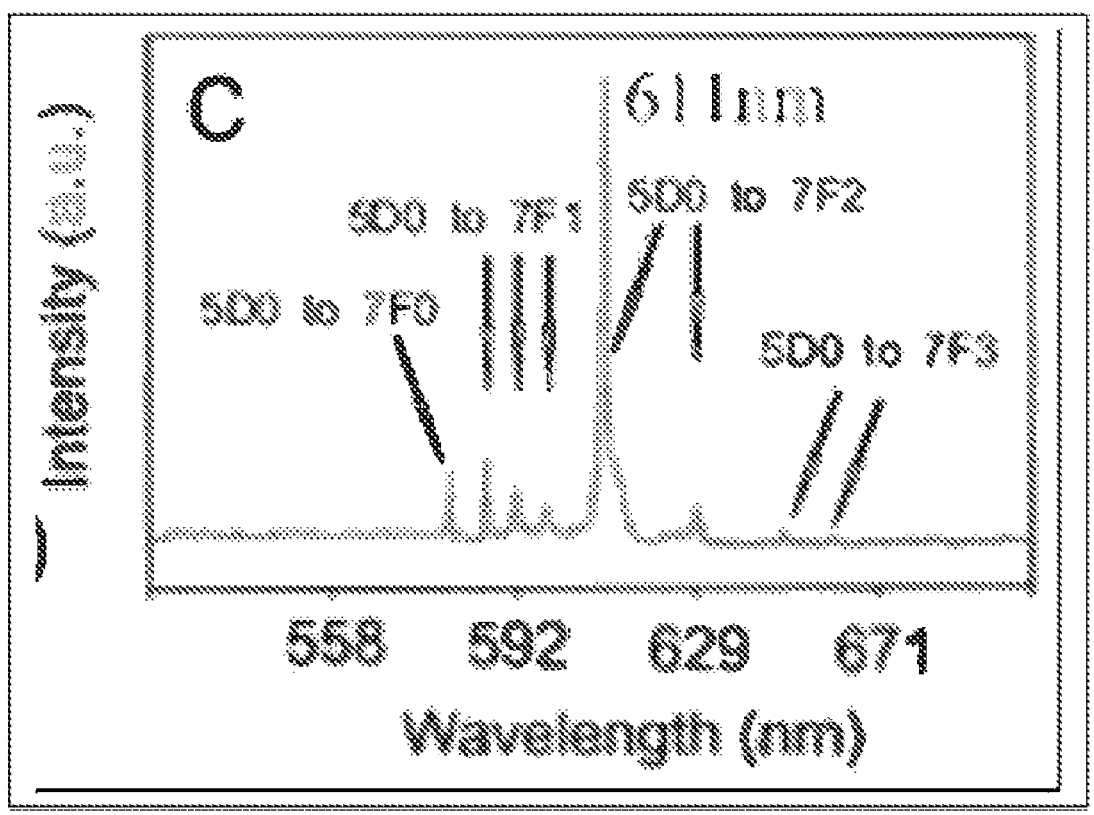
FIG. 7(c) shows the photo-luminescence spectrum of a third example of the invention.
Figure 8A:
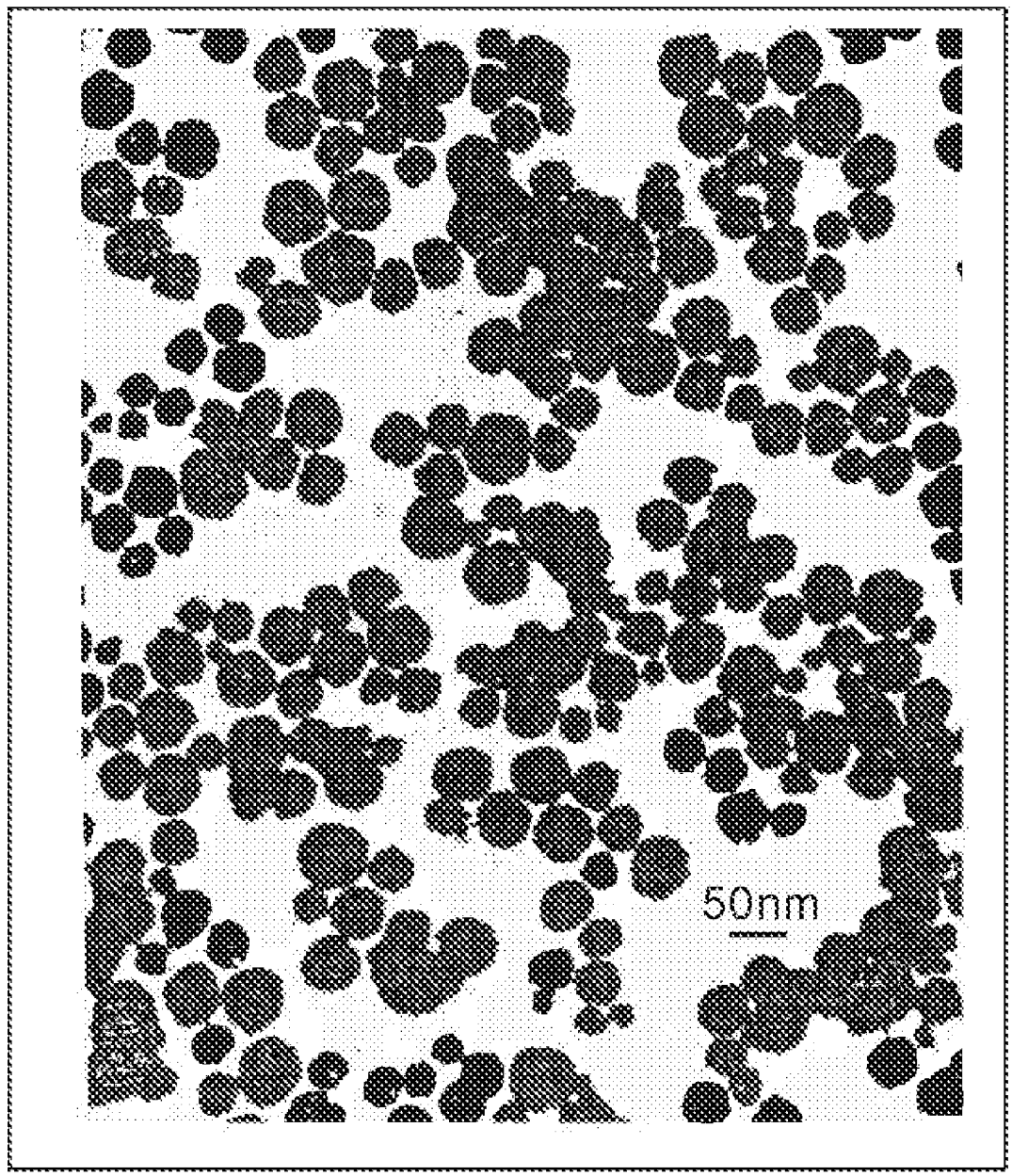
Figure 8B:
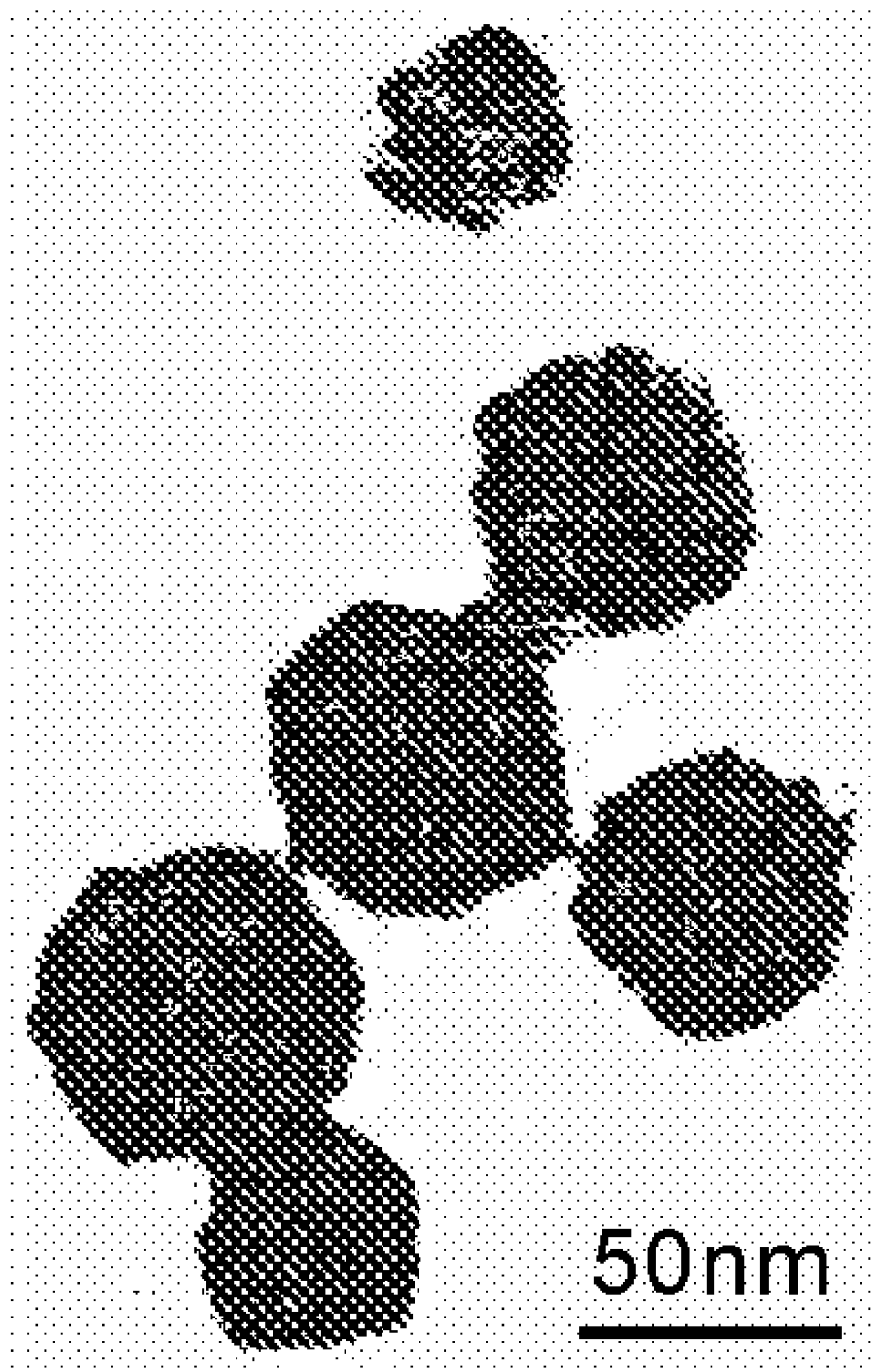
FIG. 8(b) is a higher magnification of the TEM image of FIG. 8(a).

FIG. 7(c) illustrates the photo-luminescence spectrum of a third embodiment, which is nano-particles comprising layers of Yttrium (III) Oxide, silica and Europium Oxide, i.e. $Y_2O_3/SiO_2/Eu_2O_3$. The spectrum of FIG. 7(c) shows nano-particles having Eu emissions due to $^5D_0$-to-$^7F_j$(j=0, 1, 2, 3) intra-4-f-electron shell transitions of $Eu^{3+}$. The intense peak at 611 nm ($^5D_0$-to-$^7F_2$) is much stronger than that of the conventionally used yttrium-based photo-luminescence configuration (not provided), i.e. $Y_2O_3$ layered with Eu-phosphor-doped silicon. The intense peak is attributed to both the optimal photo-luminescence configuration and random resonance effect, i.e. coherent recurrent light scattering among nano-particles in a random medium which further enhances photo-luminescence. FIG. 8(a) is a corresponding TEM image of $Y_2O_3/SiO_2/Eu_2O_3$ nano-particles. FIG. 8(b) is a higher magnification of the TEM image, showing the $Y_2O_3/SiO_2/Eu_2O_3$ nano-particles to have an average diameter of about 50 nm.

In the case of each of the above embodiments, the excitation was performed in a wavelength non-resonant with the acceptor, so that the energy was absorbed by the donor atoms/ions in the donor layer 101, and transferred to the acceptor atoms/ions in the acceptor layer 105. All spectra were obtained at room temperature proving that thermal quenching due to phonon-assisted and Auger-decay backflow was small, i.e. the barrier layer 103 was sufficiently thick for asymmetric energy transfer.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

For example, although the described embodiments use $SiO_2$ as the barrier layer material, it is possible to use other material capable of providing the energy transfer asymmetry between the donor layer and the acceptor layer, such as $Si_3N_4$, $Al_2O_3$, $SiO_xN_y$, and those materials having no or little free carriers. Moreover, although the embodiments use a crystalline form of a dopant material, e.g. $Er_2O_3$, as the acceptor layer 105, it is nevertheless possible to have an embodiment that uses the conventional Er-doped silicon as the acceptor layer 105 but the performance of which is improved by the asymmetric energy transfer provided by the silica barrier layer 103. Furthermore, alternative production methods other than the afore-described oxide-assisted growth (OAG), such as sol-gel processing or a combination of such processes, is useable to coat a silicon/silica core.

The invention claimed is:

1. A luminescent system comprising:
a barrier between a donor material and an optically-active material;
wherein
the barrier allows energy from the donor material to transfer to the layer of optically-active material to excite the optically active compound into photo-luminescent emission; and
the barrier restricts energy transfer from the optically-active material to the donor material.

2. A luminescent system as claimed in claim 1 wherein
the donor material comprises silica,
the barrier material comprises silicon; and
the optically-active material comprises erbium oxide.

3. A luminescent system as claimed in claim 1 wherein
the donor material is ZnS,
the barrier material is $SiO_2$, and
the optically-active material is MnS.

4. A luminescent system as claimed in claim 1 wherein
the donor material is $Y_2O_3$,
the barrier material is $SiO_2$, and
the optically-active material is $Eu_2O_3$.

5. A luminescent system as claimed in claim 1, wherein the luminescent system is a cable.

6. A luminescent system as claimed in claim 5, wherein the cable is a nanowire.

7. A luminescent system as claimed in claim 5, wherein the luminescent system is a nanowire with a radius ≦500 nm.

8. A luminescent system as claimed in claim 1 wherein the system is a nano-particle.

9. A luminescent system as claimed in claim 8 wherein the nano-particle has a radius ≦500 nm.

10. A luminescent system as claimed in claim 1 wherein the system is a nano-ribbon.

11. A luminescent system as claimed in claim 10 wherein the nano-ribbon has a thickness of ≦500 nm.

12. A luminescent system as claimed in claim 1 wherein the system is a layered film.

13. A luminescent system as claimed in claim 12 wherein the layered film is a layered nanofilm.

14. A luminescent system as claimed in claim 13 wherein the layered nanofilm has a thickness of ≦500 nm.

15. A luminescent system as claimed in claim 1 further comprising a luminescent cable wherein the optically active compound includes erbium oxide.

16. A luminescent system as claimed in claim 15 wherein the luminescent cable further comprises silicon for inducing excitation energy transfer to the erbium oxide.

17. A luminescent system as claimed in claim 15 wherein the luminescent cable is a nanocable.

18. A luminescent system as claimed in claim 1 wherein the barrier has a thickness which is thin enough to allow efficient Forster energy transfer from the donor material to the optically-active material but thick enough to prevent energy backflow from the optically-active material to the donor material.

19. A luminescent system as claimed in claim 18 wherein the barrier has a thickness of 2-5 nm.

20. A method of preparing a luminescent system comprising:
heating silicon oxide (SiO) powder to provide silicon vapors;
precipitating the silicon vapors to form one or more silicon structures having a surface layer of silica;
heating erbium metal to provide erbium vapors; and
precipitating the erbium vapors to form an erbium oxide layer on the surface layer of silica of the silicon structures; wherein
the layer of silica is a barrier between the silicon structure and the erbium oxide layer;
the barrier allowing energy from the silicon structure to transfer to the erbium oxide layer to excite the erbium oxide into photo-luminescent emission; and
the barrier restricts energy transfer from the erbium oxide layer to the silicon structure.

\* \* \* \* \*